United States Patent Office 2,752,283
Patented June 26, 1956

2,752,283

PHOSPHORUS DERIVATIVES, PROCESS FOR THEIR PREPARATION AND COMPOSITIONS CONTAINING THEM

Jean Metivier, Arpajon, France, assignor to Societe des Usines Chimiques Rhone-Poulenc, Paris, France, a French body corporate No Drawing. Application March 25, 1955,
Serial No. 496,941

Claims priority, application Great Britain April 1, 1954

10 Claims. (Cl. 167—33)

This invention is for new phosphorus derivatives and to processes for their preparation, and includes industrially useful compositions containing these new compounds.

The compounds of the present invention are phosphorus derivatives of γ-pyrone and conform to the general formula:

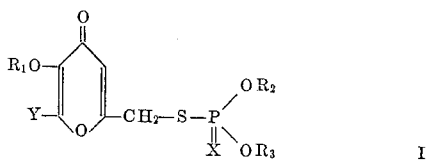

in which X represents an oxygen or sulphur atom, Y represents a hydrogen or halogen atom, $R_1$ represents a hydrogen atom or an alkyl group containing not more than four carbon atoms, and $R_2$ and $R_3$ are the same or are different and each represents an alkyl group containing not more than four carbon atoms.

These new compounds may be obtained, according to a feature of the invention, by reacting a salt of the general formula:

(in which $R_2$, $R_3$ and X each have the significance hereinbefore defined and Me represents an alkali metal such as sodium or potassium) with a derivative of γ-pyrone of the general formula:

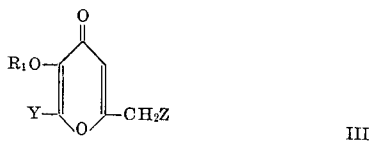

in which Z represents a halogen atom or a reactive ester group such as a sulphate or sulphonate group, and $R_1$ has the same significance as hereinbefore defined.

Those salts of general Formula II in which X represents an oxygen atom can exist in the two tautomeric forms:

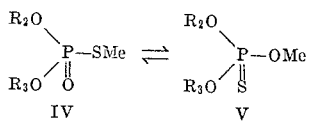

(Mastin et coll., J. A. C. S. 67, 1662 (1945)) but they react with alkyl halides in the tautomeric form IV (G. Schrader, Die Entwicklung neuer Insektizide auf Grundlage organischer Flour-und Phosphor-Verbindungen, 2nd edition, Verlag Chemie, Weinhein/Bergstr. 1952, p. 76). They may be prepared in situ by the action of flowers of sulphur on an ester of phosphorous acid of the general formula:

in the presence of an alkali metal derivative of ethyl alcohol.

The reaction is preferably effected in an organic solvent medium, of which preferred examples are aliphatic alcohols and aliphatic ketones. It is convenient to employ a reaction temperature within the range 50° C. to 100° C., in the neighbourhood of the boiling point of the solvent employed. The reaction can be effected outside this temperature range but no particular advantage results therefrom.

These esters have been found to be interesting as pesticides and, more particularly, as systemic insecticides. They may be utilised in any of the physical forms in which insecticidal materials are customarily used, normally, in association with at least one inert diluent. Thus, they may be formulated as solid compositions in conjunction, therefore, with solid diluents such as talc, clay or other such inert material. They also may be formulated as aerosols, emulsions or solutions in an organic or aqueous-organic medium and the solutions or emulsions may contain a wetting, dispersing or emulsifying agent of the ionic or non-ionic type, the latter being preferred since they are not affected by electrolytes. When use of emulsions is contemplated, the esters may be formulated as a self-emulsifying concentrate containing the active substance dissolved in the dispersing agent or in a solvent compatible with that dispersing agent, the composition being made ready for use by the simple addition of water. The new compounds may also be employed in admixture with other insecticides including substances resulting in a synergistic effect. Pesticidal compositions containing at least one of the new compounds as the active ingredient or as one of the active ingredients in association with a diluent as aforesaid are also within the scope of the present invention.

The preferred compounds of the invention in the sense of those possessing the greatest activity as systemic insecticides are 2-(diethoxyphosphinylthiomethyl)-5-methoxy-γ-pyrone, 2-(di-n-propoxyphosphinylthiomethyl)-5-methoxy-γ-pyrone, 2-(di-isopropoxyphosphinylthiomethyl)-5-methoxy-γ-pyrone, 2-(dimethoxyphosphinothioylthiomethyl)-5-methoxy-γ-pyrone, 2-(diethoxyphosphinothioylthiomethyl)-5-methoxy-γ-pyrone, 2-(di-n-propoxyphosphinothioylthiomethyl)-5-methoxy-γ-pyrone, 2-(di-isopropoxyphosphinothioylthiomethyl) - 5 - methoxy-γ-pyrone and 2-(diethoxyphosphinothioylthiomethyl)-5-ethoxy-γ-pyrone.

It should be understood that the nomenclature employed in this specification conforms to the Editorial Report on Nomenclature, 1952, of The Chemical Society (London).

The following non-limitative examples illustrate the invention.

Example I

To a solution of 17.5 g. of 2-chloromethyl-5-methoxy-γ-pyrone (prepared according to the method of Campbell et col., J. Org. Chem. 15, 223 (1950)) in 100 cc. of methylethyl ketone, there is added 22.4 g. of OO-diethyl potassium phosphorodithioate (prepared according to the method of Hoeberg and Cassaday, J. A. C. S. 73, 557 (1951)) and the mixture is heated under reflux for 3 hours. After cooling, 100 cc. of water are added and the mixture is stirred. The organic layer is separated, treated with decolourising charcoal, dried over potassium carbonate and then concentrated under reduced pressure.

The oily residue thus obtained solidifies as it cools. By crystallisation of the residue from carbon tetrachloride, there is obtained 2-(diethoxyphosphinothioylthiomethyl)-5-methoxy-γ-pyrone, which melts at 62–64° C. (Kofler).

Example II

To a suspension of 8 g. of 2-chloromethyl-5-hydroxy-γ-pyrone (prepared according to the method of Yabuta, J. C. S. 125, 575 (1924)) in 100 cc. of methylethyl ketone there is added 11.2 g. of OO-diethyl potassium phosphorodithioate (prepared by the method referred to in the preceding example) and the mixture is heated under reflux for 1½ hours. After cooling, 50 cc. of water are added, the mixture is stirred and the organic layer is separated, dried over sodium sulphate and then concentrated under reduced pressure. The residue obtained, weighing 14 g., is dissolved in 50 cc. of boiling carbon tetrachloride and the solution is then treated with decolourising charcoal. On cooling, 2-(diethoxyphosphinothioylthiomethyl)-5-hydroxy-γ-pyrone, which melts at 94° C. (Kofler block), crystallises.

Example III

To a suspension of 8 g. of 2-chloromethyl-5-hydroxy-γ-pyrone in 100 cc. of methylethyl ketone there is added 10.4 g. of OO-diethyl potassium phosphorothioate (prepared according to the method of Mastin et al., J. A. C. S. 67, 1662 (1945)) and the mixture is heated under reflux for 5 hours. After cooling, the potassium chloride is filtered off from the reaction mixture and the filtrate is treated with decolourising charcoal. The resultant solution is concentrated under reduced pressure and the oily residue thus obtained is crystallised by cooling. The solid is taken up in 20 cc. of boiling carbon tetrachloride and from the solution, which is left to crystallise, 2-(diethoxyphosphinylthiomethyl)-5-hydroxy-γ-pyrone is obtained. It melts at 70° C. (Kofler block).

Example IV

To a solution of 11.2 g. of OO-diethyl potassium phosphorodithioate in 150 cc. of methylethyl ketone there is added 9.75 g. of 2-chloromethyl-5-hydroxy-6-chloro-γ-pyrone (prepared according to the method of Woods, J. A. C. S. 72, 1039 (1950)) and the mixture is heated to 50–55° C. for two hours. After cooling, the reaction mixture is filtered and the filtrate is treated with decolourising charcoal. The organic solution is then concentrated under reduced pressure and the residue (19 g.) is crystallised from a mixture of carbon tetrachloride and petroleum ether. On drying, there are obtained white crystals of 2-(diethoxyphosphinothioylthiomethyl)-5-hydroxy-6-chloro-γ-pyrone, which melts at 78–80° C. (Kofler).

Example V

To a solution of 43.5 g. of OO-dimethyl potassium phosphorodithioate in 200 cc. of methylethyl ketone there is added 34.9 g. of 2-chloromethyl-5-methoxy-γ-pyrone and the solution is stirred for 7 hours at room temperature. It is then heated to 60–65° C. for ½ hour. The reaction mixture is then filtered and treated with decolourising charcoal. After concentration of the solution a viscous oil (53.5 g.) remains which crystallises on cooling. This residue is taken up in 250 cc. of boiling benzene and insoluble material is filtered off. The filtrate, after treatment with decolourising charcoal, is concentrated under reduced pressure and the residue obtained is crystallised from carbon tetrachloride. 2-(dimethoxyphosphinothioylthiomethyl)-5-methoxy-γ-pyrone, which melts at 90° C. (Kofler), is thus obtained.

Example VI

To a solution in 160 cc. of methylethyl ketone of 50.4 g. of OO-di-n-propyl potassium phosphorodithioate (prepared according to the method of Hoegberg et al., J. A. C. S. 73, 557 (1951)) there is added 34.9 g. of 2-chloromethyl-5-methoxy-γ-pyrone. The mixture is stirred for one hour at room temperature and then heated for 3 hours at 55–60° C. After cooling, there is added to the cold reaction mixture 2 g. of decolourising charcoal. The mixture is then filtered and the clear filtrate is concentrated under reduced pressure. A viscous, slightly coloured oil weighing 68 g. remains, analysis of which shows that it is 2-(di-n-propoxyphosphinothioylthiomethyl)-5-methoxy-γ-pyrone.

Example VII

The procedure described in Example VI is followed but the OO-di-n-propyl phosphorodithioate is replaced by OO-di-isopropyl potassium phosphorodithioate. The product obtained, 2-(di-isopropoxyphosphinothioylthiomethyl)-5-methoxy-γ-pyrone melts at 78–80° C. (Kofler).

Example VIII

To a solution of 29.2 g. of OO-diethyl potassium phosphorothioate in 200 cc. of methylethyl ketone there is added 24.5 g. of 2-chloromethyl-5-methoxy-γ-pyrone and the mixture is heated for 4 hours at 60–65° C. The reaction mixture is cooled, filtered and the filtrate is treated with decolourising charcoal. After concentrating the organic solution under reduced pressure, a residue weighing 42 g. is obtained which crystallises on cooling. This residue is taken up in 200 cc. of boiling benzene and treated with decolourising charcoal. After evaporation of the solvent under reduced pressure, the residue obtained is crystallised from carbon tetrachloride. There is thus obtained 2-(diethoxyphosphinylthiomethyl)-5-methoxy-γ-pyrone, which melts at 70–72° C.

Example IX

To a solution of 23.7 g. of diethyl hydrogen phosphite (prepared according to the method of MacCombie et al., J. C. S. 380 (1945)) in 40 cc. of ethanol there is added 71.4 cc. of a 2.1 N solution of sodium ethylate and then 4.8 g. of flowers of sulphur. After heating for one hour at 70–75° C., the reaction mixture is allowed to cool and to it is then added 21.7 g. of 2-chloromethyl-5-methoxy-γ-pyrone. The mixture is heated for 3 hours at 50–55° C. whereafter it is filtered and concentrated under reduced pressure. The crude product obtained is then treated as described in Example VIII. After crystallisation from carbon tetrachloride, 2-(diethoxyphosphinylthiomethyl)-5-methoxy-γ-pyrone (30 g.), which melts at 70–72° C., is obtained.

Example X

To a solution of 28.6 g. of di-isopropyl hydrogen phosphite (prepared according to the method of MacCombie et al., J. C. S. 380 (1945)) in 40 cc. of ethanol there is added 78.5 cc. of a 1.91 N solution of sodium ethylate and 4.8 g. of flowers of sulphur. After heating for one hour at 70–75° C., 26.2 g. of 2-chloromethyl-5-methoxy-γ-pyrone is added and the mixture is heated for 3 hours at 50–55° C. The reaction mixture is filtered and the filtrate is concentrated under reduced pressure. After treating the crude product (43 g.) as described in Example VIII, 2-(di-isopropoxyphosphinylthiomethyl)-5-methoxy-γ-pyrone, which melts at 66–68° C. (Kofler), is obtained.

Example XI

The procedure described in Example X is followed but the di-isopropyl hydrogen phosphite is replaced by di-n-propyl hydrogen phosphite (prepared by the method of MacCombie et al., J. C. S. 380 (1945)). There is thus obtained 2-(di-n-propoxyphosphinylthiomethyl)-5-methoxy-γ-pyrone, which melts at 60° C. (Kofler).

Example XII

To a solution of 2-chloromethyl-5-ethoxy-γ-pyrone in 150 cc. methylethyl ketone there is added 11.2 g. of OO-diethyl potassium phosphorodithioate. After heating the mixture for 2 hours at 50–55° C., the potassium chloride formed is filtered off and the filtrate after treatment with decolourising charcoal is treated as described in Example VIII. A slightly coloured oil is obtained which crystallises after a long period at 0° C. The product, 2 - (diethoxyphosphinothioylthiomethyl) - 5 - ethoxy-γ-pyrone, melts at 46–48° C. (Kofler).

2-chloromethyl-5-ethoxy-γ-pyrone, which melts at 76–78° C. (Kofler), is prepared by the action of thionyl chloride on 2-hydroxymethyl-5-ethoxy-γ-pyrone (Yabuta J. C. S. 125, 580 (1924)) by analogy with the preparation of 2-chloromethyl-5-methoxy-γ-pyrone (Campbell et al., J. Org. Chem. 15, 223 (1950)).

Example XIII

The procedure described in Example XII is followed using 15.7 g. of OO-dimethyl potassium phosphorodithioate, 11.3 g. of 2-chloromethyl-5-ethoxy-γ-pyrone and 150 cc. of methylethyl ketone. The 2-(dimethoxyphosphinothioylthiomethyl) - 5 - ethoxy-γ-pyrone obtained is crystallised from carbon tetrachloride. It melts at 76–78° C. (Kofler).

The following examples illustrate insecticidal compositions according to the present invention.

Example XIV

A self-emulsifying concentrate is prepared containing:

2 - (diethoxyphosphinothioylthiomethyl)-5-methoxy-γ-pyrone _____ g__ 10
Acetone _____ g__ 25
Scurol "O" (an ethylene oxide polymer containing 10 molecules of ethylene oxide to 1 molecule of octylphenol) _____ g__ 10
Dimethylacetonylcarbinol, q. s. _____ cc__ 50

For use, this concentrate is diluted with water to a concentration of 5 to 100 g. per hectolitre.

Example XV

In the formulation of Example XIV 2-(diethoxyphosphinylthiomethyl)-5-methoxy-γ-pyrone is substituted for 2-(diethoxyphosphinothioylthiomethyl)-5-methoxy-γ-pyrone.

Example XVI

In the formulation of Example XIV 2-(dimethoxyphosphinothioylthiomethyl)-5-methoxy-γ-pyrone is substituted for 2 - (diethoxyphosphinothioylthiomethyl) - 5 - methoxy-γ-pyrone.

The efficacy of insecticidal compositions of this invention is illustrated by the following experiments.

Tests are carried out using the black bean aphis, the "*Aphis rumicis*," on Nasturtium dwarf (Tom Thumb) mixed. The nasturtiums used in the experiments are subjected to a temperature of 25° C. for 4 days whereafter they are placed in a strongly lit open cupboard for a further 4 days. They are then well developed and after being carefully pulled up the roots are well washed. The roots are then immersed in a solution of the substance to be studied contained in a test tube, and the test tube closed by a cotton wool plug to reduce evaporation of the solution to a minimum. Two days later, the nasturtium plants are contaminated with aphis which are placed in groups of five under small glass covers on the primary leaves and the mortalities which occur are observed.

In the following table, which lists the results obtained using phosphorus derivatives of general Formula I in which Y represents a hydrogen atom, the insecticidal activity of the substance is given in the form of the liminal active dose, i. e. the dose which gives 90–100% mortality in 3 to 4 days.

| $R_1$ | X | $R_2$ and $R_3$ | Liminal Active Dose |
|---|---|---|---|
| (a) $CH_3$ | O | $C_2H_5$ | $10^{-7}$ |
| (b) $CH_3$ | O | $nC_3H_7$ | $1.5 \times 10^{-7}$ |
| (c) $CH_3$ | O | $isoC_3H_7$ | $10^{-7}$ |
| (d) $CH_3$ | S | $CH_3$ | $2 \times 10^{-7}$ |
| (e) $CH_3$ | S | $C_2H_5$ | $2 \times 10^{-7}$ |
| (f) $CH_3$ | S | $nC_3H_7$ | $2 \times 10^{-6}$ |
| (g) $CH_3$ | S | $isoC_3H_7$ | $2 \times 10^{-6}$ |
| (h) $C_2H_5$ | S | $C_2H_5$ | $2 \times 10^{-7}$ |

Substances (*a*) and (*e*) when tested in a greenhouse on the green peach aphis (*Mysus persicae*) showed good activity (90–100% mortality) in a dose of 25–50 g. per hectolitre.

I claim:

1. A member of the class consisting of the phosphorus derivatives of the general formula:

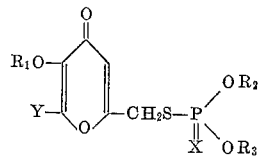

in which X is selected from oxygen and sulphur, Y is selected from hydrogen and chlorine, $R_1$ represents a member of the class consisting of hydrogen and alkyl groups containing at most four carbon atoms, and $R_2$ and $R_3$ each represent an alkyl group containing at most four carbon atoms.

2. 2 - (diethoxyphosphinylthiomethyl) - 5 - methoxy-γ-pyrone.

3. 2 - (di-isopropoxyphosphinylthiomethyl - 5 - methoxy-γ-pyrone.

4. 2-(dimethoxyphosphinothioylthiomethyl) - 5 - methoxy-γ-pyrone.

5. 2 - (diethoxyphosphinothioylthiomethyl)-5-methoxy γ-pyrone.

6. 2-(diethoxyphosphinothioylthiomethyl) - 5 - ethoxy-γ-pyrone.

7. Process for the preparation of new phosphorous derivatives which comprises heating a salt of the general formula:

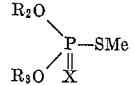

with a derivative of γ-pyrone of the general formula:

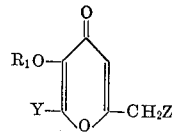

in which Me represents an alkali metal, Z is selected from halogen sulphate and sulphonate radials and X, Y, $R_1$, $R_2$ and $R_3$ each have the same significance as defined in claim 1.

8. Process according to claim 7 wherein the salt is prepared in situ by heating flowers of sulphur with an ester of phosphorous acid of the general formula:

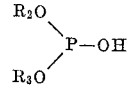

in the presence of an alklai metal derivative of ethyl alcohol, the groups $R_2$ and $R_3$ each having the same significance as in claim 1.

9. Process according to claim 7 wherein the reaction is effected at a temperature within the range of 50° C.

to 100° C. in an organic solvent medium selected from aliphatic alcohols and aliphatic ketones.

10. Pesticidal compositions containing at least one compound of the general formula:

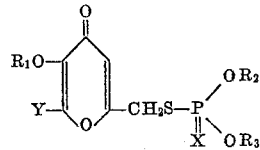

in which X is selected from oxygen and sulphur, Y is selected from hydrogen and chlorine, $R_1$ represents a member of the class consisting of hydrogen and alkyl groups containing at most four carbon atoms, and $R_2$ and $R_3$ each represent an alkyl group containing at most four carbon atoms, in association with a diluent.

References Cited in the file of this patent

UNITED STATES PATENTS

| | | |
|---|---|---|
| 2,583,744 | Schrader | Jan. 26, 1952 |
| 2,624,745 | Schrader | Jan. 6, 1953 |
| 2,657,229 | Orochena | Oct. 27, 1953 |